Patented May 5, 1953

2,637,639

UNITED STATES PATENT OFFICE 2,637,639

2-METHYLCHLOROPHENOXYACETATE HERBICIDES

Frank Talbot and Reginald Thomas Foster, Widnes, England, assignors to Imperial Chemical Industries Limited, a corporation of Great Britain No Drawing. Application March 13, 1950, Serial No. 149,456. In Great Britain March 28, 1949

9 Claims. (Cl. 71—2.4)

This invention relates to the production of organic compounds and especially to an improved process for the production of soluble salts of methylchlorophenoxyacetic acids.

2-methyl-4-chlorophenoxyacetic acid and its salts are known to be good selective weedkillers, and it has been customary to use for this purpose the crude liquid product obtained by the condensation of monochloroacetic acid with monochloro-o-cresol in aqueous alkaline, generally caustic soda, solution. The composition of this liquid product depends upon whether the crude chlorinated o-cresol, containing 65% of the 4-chloro- and 35% of the 6-chloro-isomer, is reacted as such or whether it is separated into its constituents. In the former case, preferential reaction of the 4-chloro isomer takes place and the resultant methylchloro-phenoxyacetates are composed of 70% of the active 2:4 isomer and 30% of the relatively inactive 2:6 isomer. The two isomeric chlorocresols may alternatively be completely separated, for instance by vacuum distillation, or they may be partially separated by distilling off most of the lower-boiling 2:6 compound leaving as residue all the 2:4 material and a small amount of the 2:6 compound, the 2:4 isomer or its concentrate being then condensed in the usual way with monochloroacetic acid. When such separation is resorted to, the final methylchlorophenoxyacetic acid salt consists principally of the active isomer but on the other hand neither the total yield from the reaction nor the yield of active material is as good as that obtained from the condensation of the crude chlorocresol mixture.

Whichever of these methods is used the crude liquid product contains in solution in addition to the sodium salt of 2-methylchlorophenoxyacetic acid, other salts formed during the reaction, such as sodium glycollate and sodium chloride, and the presence of these impurities causes separation from the cooled solution of crystals of sodium methylchlorophenoxyacetates and other solids when the concentration of the desired organic salts is greater than about 15% by weight, i. e. about 10% by weight of the active 2:4 derivative in the case where crude chlorocresol is used. This precipitation in the more concentrated solutions leads to obvious transport difficulties, and it has previously been the practice to use the more stable, relatively dilute solutions. Even these dilute solutions, however, tend to be unstable at temperatures below 0° C. It is also obvious that the transport of such dilute solutions is expensive and wasteful, and it is an object of this invention to provide a stable more concentrated solution containing at least 25% of the sodium salt of 2-methyl-4-chlorophenoxyacetic acid.

In some cases, indeed, it may be preferred to prepare the salts in solid form and to make up solutions when and where they are required. The total solids present in the crude liquid condensation product are composed of about 57% of sodium-2-methylchlorophenoxyacetate, 24% of sodium chloride and 10% of sodium glycollate, the remainder consisting of sodium cresylate and other minor impurities. Complete removal of the water, therefore, will give a solid product whose content of methylchlorophenoxyacetic acid salts cannot exceed 57%, and further purification has so far resulted in loss of yield. As already mentioned, these salts can be precipitated by cooling their more concentrated solutions, but such separation is only partial. It is therefore a further object of the invention to obtain a solid product containing substantially all the sodium methylchlorophenoxyacetate in high concentration.

In British Patent No. 623,217 there is described and claimed a continuous method for obtaining solid 2-methyl-4-chlorophenoxyacetic acid containing not more than 10% of water and in a suitably granular form, from the crude liquid reaction product obtained from the condensation of 4-chloro-o-cresol, alone or admixed with other chloro-cresols, with monochloroacetic acid in the presence of aqueous alkali.

In this process the crude product is continuously acidified at a temperature at which the precipitated crude 2-methyl-4-chlorophenoxyacetic acid is molten while at the same the mixture is subjected to vigorous agitation, the mixed aqueous and molten organic phases are continuously fed to a second vessel maintained at a temperature at which the 2-methyl-4-chlorophenoxyacetic acid remains molten, and the two phases are allowed to separate by settling, the layer of molten 2-methyl-4-chloro-phenoxyacetic acid being run off and allowed to cool. The crude product obtained by reacting the crude mixture of monochlorinated o-cresols with monochloroacetic acid, as described in British Patent No. 573,479, can also be treated according to the said process, the acid finally obtained being in this case a mixture of the 2:4- and 2:6-isomers in the relative proportions of 70 to 30 parts by weight.

We have now found that the 2-methylchlorophenoxyacetic acids such as are produced in the aforementioned process are extremely suitable materials from which to prepare the water-soluble salts of these acids in highly concentrated form, either as stable aqueous solutions or as solids, by treatment with an appropriate alkaline reagent.

According to the present invention, therefore, a three-stage process for the production in a stable highly concentrated form of the water-soluble salts of 2-methyl-4-chlorophenoxyacetic acid from the crude liquid product obtained by the condensation of a monochlorinated o-cresol and monochloroacetic acid in aqueous alkaline solution comprises subjecting the said liquid product to acidification with vigorous agitation at a temperature at which the precipitated 2-methylchlorophenoxyacetic acid is molten, feeding the mixed aqueous and molten organic phases to a second vessel maintained at a temperature above the melting point of the said acid and separating the two phases, and passing the separated molten acid into a third vessel into which is also introduced an alkaline reagent which will react with the acid to give a water-soluble salt, advantageously in such amount that an excess of approximately 0.5% to 1.7% over the theoretical is present in the product, together with, if desired, sufficient water to produce a concentrated solution of the said salt. Advantageously, the various operations are carried out continuously.

By the term "highly concentrated form" we mean either a concentrated aqueous solution or a solid containing over 65% of the salts of the methylchlorophenoxyacetic acids.

In the descriptive matter which follows the liquid product referred to is in all cases that obtained by the condensation of monochloroacetic acid with a crude monochlorinated o-cresol, but it is to be understood that the liquid products obtained by use of the alternative methods of preparation indicated hereinbefore may also be treated according to the present invention.

A saturated solution of the sodium salt of 2-methyl-4-chlorophenoxyacetic acid will contain about 40% of the salt, while the 2-methyl-6-chloro-derivative is rather more soluble. By use of the process of the invention the principal impurities present in the original solution are removed in the aqueous phase separated in the second stage and it is thus possible to obtain stable solutions of the desired salts up to the limit of saturation, or alternatively to obtain a solid material containing a high proportion of these salts. Such solutions will contain between 36% and 50% of the salts and only very minor proportions of impurities and they are stable at normal temperatures, no precipitation of solid taking place on standing. The chlorocresol, obtained from the sodium chlorocresylate after acidification, is however mostly retained in the molten acid layer. This impurity may be removed by other methods, for example, by first subjecting the partly acidified liquid condensation product to steam distillation as described in British Patent No. 592,827, and it is desirable to carry out this step on the crude liquid product before subjecting the latter to the process of the invention.

The alkaline reagent is suitably the hydroxide or carbonate of an alkali metal or of ammonium, the sodium compounds being preferred on account of their cheapness and ready availability. Any hydroxide or carbonate which is not decomposed at the reaction temperature and whose cation gives a water-soluble salt of 2-methyl-4-chlorophenoxyacetic acid may, however, be used in carrying out the process of the invention.

The product may be either a solid or a concentrated aqueous solution, and in the latter case sufficient water should be present to provide a solution of the desired strength. Not all the water needs to be added, since the molten acids derived from the second stage of the process generally contain about 10% of occluded water, while in addition water is formed as a product of the neutralisation reaction. Both these factors must therefore be taken into account when estimating the total water required. If caustic soda is used, for example, it is found that an aqueous solution containing approximately 20% by weight of caustic soda will give a practically saturated solution of the sodium 2-methylchlorophenoxyacetates, that is, one having a content of 33–34% of the active isomer.

This saturated solution is stable at normal temperatures and can be stored with little deposition of solid, but we have found that solutions of rather lower concentration containing about 30% of the active salt although equally stable at normal temperatures possess a greater stability at low temperatures and can be cooled to temperatures down to $-10°$ C. without any loss of homogeneity. When a concentrated solution is required, therefore, the alkaline reagent is advantageously an aqueous solution of strength sufficient to give a product whose content of the active 2-methyl-4-chlorophenoxyacetic acid salt is about 30%. For practical purposes, the product obtained from 20% caustic soda may be diluted to give this solution of optimum stability. On the other hand, the latter may be directly obtained by using a less concentrated solution of caustic soda, 16% by weight giving a solution of the required content of the active isomer. Alkali metal carbonates can be employed instead of the hydroxides, but evolution of carbon dioxide is liable to cause some difficulty and, in the case of sodium carbonate, there is the additional disadvantage that its solubility in water is too low to enable a 30% active solution of the required salts to be directly obtained.

If the solid salts are required, these may be simply obtained by reacting the molten acids either with solid alkali or with a highly concentrated aqueous solution of the alkali which is liquid at the reaction temperature such as, for example, a solution of caustic soda of up to 70% by weight. The latter method is in general more convenient in operation since it is easier thus to obtain an intimate mixture of the reactants and to avoid the formation of pockets of unreacted material. Solids containing up to 65% of active material may be obtained in this way. Phenolphthalein may be used as indicator to the alkalinity of the product, but it is preferable in the preparation of the solid salts to use slightly more than the theoretical amount of alkali, a product containing about 5% excess being more easily handled and more suitable for incorporation in herbicidal compositions.

The stability of the concentrated solutions of salts of 2-methylchlorophenoxyacetic acid is critically affected by the quantity of free alkali present. For instance, solutions containing about 30% of the active salt must also contain from about 0.5% to about 1.7% of free alkali. If the alkali content is less than 0.5% the solutions will not remain clear on dilution, while an alkali content of much over 1.7% has a salting-out effect and crystallisation of the salt will occur. The use of phenolphthalein as indicator during the neutralisation step ensures that the solution contains the minimum amount of free alkali, and the alkali addition is carefully regulated so that its content in the product will not exceed the above critical value.

It is therefore advantageous to have present in admixture with the salt of 2-methyl-4-chlorophenoxyacetic acid, whether the latter be in solid form or in solution, free alkali in amount approximately equal to from 1.8% to 6% of the weight of the said salt.

The crude liquid consensation product used as raw material in the present process contains from 5% to 20% of the sodium salt of 2-methylchlorophenoxyacetic acid. More concentrated solutions do not give entirely satisfactory results since on acidification with a mineral acid the sodium sulphate or sodium chloride formed are also precipitated with the organic acid at the higher concentrations, and in addition the difference between their specific gravities and that of the free molten acids becomes too small to ensure a satisfactory separation.

The acidification step may be carried out by means of aqueous hydrochloric or sulphuric acids. The strength of acid is not critical but it is found convenient to use the strongest available hydrochloric acid i. e. 36% by weight, since a small amount of product is lost by solution in the aqueous phase and the greater the amount of additional water introduced the greater this loss will be. Furthermore, more steam is required to heat a larger bulk of liquid. If sulphuric acid is used, 30–50% by weight is a suitable strength. The acid should be fed at such a rate that the contents of the acidification vessel are just acid to Congo red, a pH of about 3 thus being maintained.

In the neutralisation vessel, a pH of about 11 is desirably maintained and the solution of alkali should be fed at such a rate that the reaction mixture is alkaline to phenolphthalein.

In one form of the invention the crude condensation product of a monochlorinated o-cresol and monochloroacetic acid diluted to a concentration of 10% of sodium 2-methyl-4-chlorophenoxyacetate is treated according to the process of British Patent No. 623,217 by subjecting it to continuous acidification with concentrated aqueous hydrochloric acid at a temperature between 80° and 85° C., that is, above the melting point of the mixed methylchlorophenoxyacetic acids, the mixture being vigorously stirred throughout the operation, running off the product continuously into a second vessel also heated to a temperature high enough to maintain the acids in a molten state and allowing to settle. The aqueous phase is separated from the molten organic phase and the latter is continuously passed into a third stirred and heated vessel into which there is simultaneously fed an aqueous solution of caustic alkali, the strength of the latter being preferably chosen so that the resultant solution of methylchlorophenoxyacetates contains at least about 30% by weight of the active isomer. The alkali feed is at such a rate that the product is kept just alkaline to phenolphthalein and specific gravity determinations are carried out at frequent intervals in order to provide a rough guide to the strength of the product and consequently to the operation of this stage. The liquid product from the neutralisation vessel is cooled and passed directly to collecting vessels, the contents of each of which are analysed for their concentration of active material by the standard method. They are then diluted with water if necessary to bring them to a concentration of 30% active salt and are passed directly to storage.

Should the solid salts of the methylchlorophenoxyacetic acids be required, these may be readily obtained by a modification of the above process in which the separated molten acids are reacted either with solid alkali or with a hot concentrated solution thereof.

In the first case, solid alkali may be added with vigorous agitation to the molten acids prepared as before and maintained at a temperature of about 80° C. until the mixture contains a slight excess of alkali, after which it is advantageously heated gently for a short period in order to remove any retained water produced in the reaction. It may then be cooled and ground to a suitable texture. This method requires a highly efficient mixer since otherwise unreacted material is liable to be retained within the mass.

In a further form of the invention, a hot concentrated solution of alkali is used in place of the solid. The molten mixture of organic acids prepared as described above is fed into the stirred and heated neutralisation vessel simultaneously with a hot concentrated solution of alkali which is liquid at the temperature of the molten acids, that is, at about 80° C. For instance, a solution of caustic soda containing from 60% to 70% of NaOH may be employed. As before, the alkali is added at least until the mixture shows an alkaline reaction to phenolphthalein, but it is again found desirable in practice to have a slight excess of alkali in the final product. The fluid mass is well mixed and its temperature is then raised to 110° C. in order to remove most of the water present. A product containing as much as 10% of water will solidify and is capable of being finely ground, but this quantity of water is generally initially present in the molten acids and after reaction the fluid mass will also contain the water which was present in the solution together with the water formed during the reaction.

After removal of the excess water the product is cooled, forming a brittle solid which may be ground to a free-flowing powder readily soluble in water. This will contain 80% or more of 2-methylchlorophenoxyacetates with a content of at least 56% of active material.

The melting point of the mixed acids is about 70° C. and the contents of the acidification vessel and separator should be maintained at a temperature between 80° and 85° C. When a solid product is required the contents of the neutralisation vessel are preferably kept at as high a temperature as possible, say up to 110° C., in order to drive off the excess water, the heat for this purpose being obtained partially from the heat liberated by the neutralisation process and partially from external heating means. In the preparation of the concentrated solution, however, the temperature of this vessel should be kept fairly low, say not higher than 70° C., in order to prevent loss of water by evaporation. The vessel is then suitably fitted with cooling means such as for example a water jacket.

The following examples illustrate but do not limit the invention.

*Example 1*

The starting material was a crude solution of the mixed sodium salts of 2-methyl-4-chloro- and 2-methyl-6-chloro-phenoxyacetic acids containing 10% of the former. This solution was contained in a gravity tank and was passed through a steam-jacketed preheater to the acidification vessel simultaneously with 36% hydrochloric acid. The two liquids were allowed to enter the vessel at rates of 380 litres and 42 litres per hour respectively.

The acidification vessel was an enclosed steam-jacketed lead-lined vessel fitted with a flat paddle stirrer and a thermometer pocket and having two dip pipes for the entrance of the 10% solution and the hydrochloric acid together with an overflow pipe near the top through which the reaction mixture passed to the separator. The contents of the acidification vessel were heated to 85° C. with stirring, and the suspension of molten 2-methylchlorophenoxyacetic acids in aqueous salt solution overflowed continuously into the steam-jacketed separation vessel, where it was allowed to settle. An overflow pipe served to remove the aqueous layer, while a run-off pipe conveyed the separated molten acids to the neutralisation vessel. The latter was fitted with a water jacket and stirrer and the usual feed pipes for the molten acids and the alkali solution and an overflow pipe to carry off the product. 16% caustic soda solution was run in at the rate of 51 litres per hour and the mixture well stirred. When the product was passing over into the collecting vessel, cooling water was run through the jacket of the neutralisation vessel.

Every half-hour the product was tested for alkalinity to phenolphthalein and for specific gravity, the latter value acting as a rough guide to the concentration of the solution. The specific gravity of a 30% solution is between 46° and 46.5° Tw. at 20° C.

The total yield of active material was about 96%. The following table gives the analytical figures for the starting material and the product.

| Sample | Percent active 2.4-salt | Percent sodium chloride | Percent sodium glycollate |
|---|---|---|---|
| Feed stock | 10.06 | 6.1 | 2.7 |
| Product | 30.00 | 0.6 | 1.3 |

After 8 hours storage of the product at −10° C. no precipitation took place.

*Example 2*

The starting material was the same as in Example 1, the molten acids being obtained as before by acidification and separation. In this case, however, before entering the main acidification vessel the hot crude solution was passed through a subsidiary vessel into which was simultaneously fed sufficient 36% hydrochloric acid to set free the chlorocresol from the dissolved sodium chlorocresylate, and this chlorocresol was removed by passing live steam into the mixture.

After acidification and separation of the molten acids as before, these were conveyed to the neutralisation vessel which in this case was surrounded by a steam jacket. 63% caustic soda solution maintained at 80° C. was run in at the rate of 11.8 litres per hour (measured at 80° C.) and the mixture well stirred. The contents of the neutralisation vessel were maintained at a temperature of about 110° C. by means of the heat of reaction and steam heating when necessary and molten sodium 2-methylchlorophenoxyacetate was run off continuously, via the overflow pipe, and cooled to give a solid containing about 63% of sodium 2-methyl-4-chlorophenoxyacetate. The total yield of active material was about 96% of that fed to the process.

Having now particularly described and ascertained the nature of our invention and in what manner the same is to be performed, we declare that what we claim is:

1. A process for the production of a stable, highly concentrated form of the water-soluble salts of 2-methyl-4-chlorophenoxyacetic acid from the crude liquid product obtained by the condensation of a monochlorinated o-cresol and monochloroacetic acid in aqueous alkaline solution, said process comprising the steps of acidifying said crude liquid product while vigorously agitating the same in a first vessel maintained at a temperature at which the precipitated 2-methyl chlorophenoxyacetic acids are molten, feeding the resulting mixed aqueous and molten organic acid phases into a second vessel maintained at a temperature above the melting point of said acids and separating the two phases, and thereafter passing the separated molten organic acid phase into a third stirred vessel and treating said acid phase with an alkaline reagent which reacts with the acid to give a water-soluble salt, said alkaline reagent being employed in an amount sufficient to provide an excess of approximately 0.5% to 1.7% over that theoretically required for the salt formation.

2. A process according to claim 1 in which the crude liquid contains from 5% to 20% by weight of the sodium salt of 2-methylchlorophenoxyacetic acid.

3. A process according to claim 1 in which the alkaline reagent is added at such a rate that the pH of the reaction mixture is maintained at about 11.

4. A process according to claim 1 in which the alkaline reagent is caustic soda together with from 0% to approximately 84% of its weight of water.

5. A continuous process according to claim 4 in which the caustic soda solution contains approximately 84% of water.

6. A continuous process according to claim 4 in which the caustic soda solution contains from 30% to 40% by weight of water, and excess water is removed from the product.

7. The process of claim 1, wherein said alkaline reagent is added with sufficient water to produce an aqueous solution containing at least 25% by weight of the salt of 2-methyl-4-chlorophenoxyacetic acid.

8. A composition of matter containing a 2-methylchlorophenoxyacetate which is capable of giving a physically stable concentrated solution upon being dissolved in water, said composition comprising at least 65% by weight of a water-soluble salt of 2-methyl-4-chlorophenoxyacetic acid together with free alkali in amount equal to from 1.8% to 6% of the weight of the said salt.

9. An aqueous solution of a 2-methylchlorophenoxyacetate comprising at least 25% by weight of a water-soluble salt of 2-methyl-4-chlorophenoxyacetic acid and from 1.8% to 6% by weight of said salt of free alkali, said free alkali stabilizing said solution against precipitation of said salt.

FRANK TALBOT.
REGINALD THOMAS FOSTER.

References Cited in the file of this patent

UNITED STATES PATENTS

| Number | Name | Date |
|---|---|---|
| 2,485,146 | Foster | Oct. 18, 1949 |
| 2,511,784 | O'Neal | June 13, 1950 |

FOREIGN PATENTS

| Number | Country | Date |
|---|---|---|
| 573,476 | Great Britain | Nov. 22, 1945 |
| 573,479 | Great Britain | Nov. 22, 1945 |
| 573,510 | Great Britain | Nov. 23, 1945 |
| 592,827 | Great Britain | Sept. 30, 1947 |